(No Model.)
W. T. SHAW.
INK OR MUCILAGE VESSEL.
No. 411,356. Patented Sept. 17, 1889.
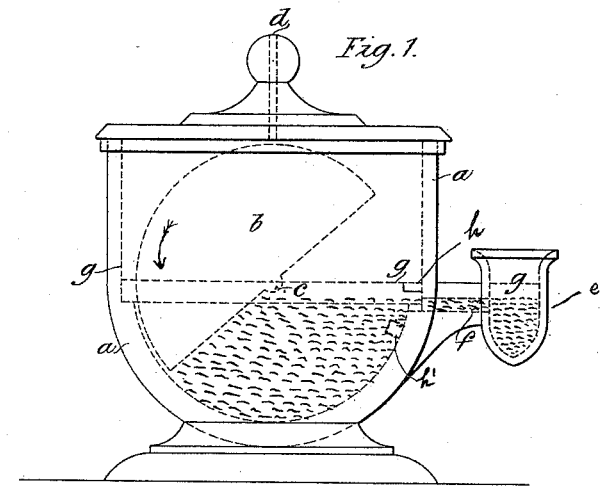
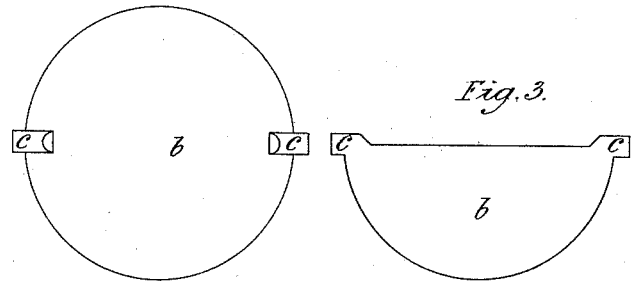
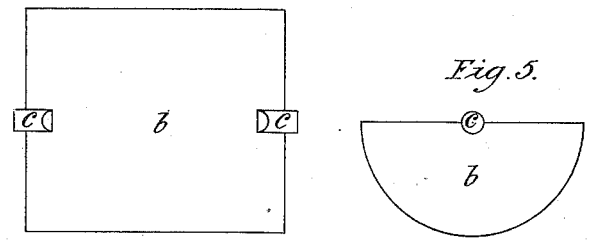
Witnesses
Baltus DeLong.
C. M. Brooke.
Inventor
Wm. Thos. Shaw.
By his Atty's.
Baldwin Davidson & Wright

UNITED STATES PATENT OFFICE.

WILLIAM THOMAS SHAW, OF LONDON, ENGLAND.

INK OR MUCILAGE VESSEL.

SPECIFICATION forming part of Letters Patent No. 411,356, dated September 17, 1889.

Application filed November 28, 1888. Serial No. 292,124. (No model.) Patented in England December 15, 1887, No. 17,292.

*To all whom it may concern:*

Be it known that I, WILLIAM THOMAS SHAW, manufacturer, a subject of the Queen of Great Britain, residing at 110 Bunhill Row, in the city of London, England, have invented certain new and useful Improvements in Vessels Suitable for Holding Ink or Mucilage, (for which I have received Letters Patent in Great Britain, No. 17,292, dated December 15, 1887,) of which the following is a specification.

I construct vessels made according to my improvements in the following manner.

The interior of the vessels consists of a hollow space of such a shape as is capable of being filled by a solid figure of revolution—as, for example, a cylinder, a sphere, a cone, or other such like figure. The lower half of such hollow space forms the reservoir containing the liquid, and communicating by an orifice at or near its surface with a small supply-well of a convenient depth. In order to maintain the liquid in the well at the same unvarying depth, I fit within the reservoir a float which is preferably hollow, hemispherical, or semi-cylindrical, of as nearly as may be the same dimensions as the lower part of the interior space of the vessel, with trunnions fixed in its axis of rotation and resting on journals in the sides of the vessel, so that the float can freely turn on its axis. The specific gravity of the float is made as nearly as possible half that of the liquid. By means of stops the float is prevented from assuming a perfectly horizontal position, whether below or above a horizontal plane passing through its axis of rotation. The float having been mounted in this manner, the top portion of the vessel is fastened on by a water-tight joint, a small hole being left at or near its summit to admit of the free passage of air into or out of the interior of the vessel. The vessel is now filled with ink or mucilage by pouring into the dipping-well as much liquid as will nearly fill the lower half of the interior space forming the reservoir, the upper half of which will then, of course, be filled by the float described above, except only such small part of the float as is held below the horizontal line by reason of its contact with the upper of the two stops before named. The lower of the two stops is fixed just below the orifice into the dipping-well. The float will be supported by the liquid in this position so long as the quantity of liquid remains unchanged; but as the liquid is withdrawn from the dipping-well the float will fall, turning on its axis, and as the proportion of its weight to be supported by the liquid continually increases its displacement of liquid increases in the same ratio, and the effect is that the surface of the liquid is maintained at the same height until the float has reached the lower stop just below the orifice into the dipping-well. This construction insures that the same depth of liquid shall always be available for dipping purposes until practically the whole of the liquid is exhausted. It has also the advantage that the reservoir of liquid is completely secluded from exposure to the ill effects of dust, evaporation, &c., while a convenient quantity, which may be no more than a thimbleful, is presented for use and replenished automatically as fast as it is removed.

In order that my said invention may be more fully understood and readily carried into effect, I will proceed to describe the drawings hereunto annexed.

In the accompanying drawings, Figure 1 is an elevation of a vessel constructed according to my invention, with the interior parts shown by dotted lines. Fig. 2 is a plan, and Fig. 3 a vertical section, of a hollow hemispherical float; and Fig. 4 is a plan, and Fig. 5 a vertical section, of a hollow semi-cylindrical float.

$a$ is the vessel, and $b$ the float, provided with trunnions $c$, about which it can turn.

$d$ is an air-inlet, and $e$ the dipping-well, which is connected to the liquid-reservoir by the duct $f$. The line $g\ g$ shows the height to which the liquid is always maintained by the float.

The body of the vessel I make of stoneware, porcelain, vulcanite, or of some metal that is not acted upon by the liquid. The floats I preferably make hollow of vulcanite, so that the specific gravity of the float shall only be equal to half that of the liquid. As liquid is withdrawn from the dipping-well a further supply at once flows in from the reservoir in consequence of the float falling, as already explained. The stop $h$ above the duct or passage *f* prevents the float from moving downwardly across the opening into the passage, while the stop *h'* prevents the float from moving upwardly, so as to cover the opening into the passage. It will be observed that the stop *h* is above the horizontal line extending through the axis of the float, so that when the float moves by gravity it will always move in the direction indicated by the arrows.

Having now particularly described and ascertained the nature of my said invention and in what manner the same is to be performed, I declare that what I claim is—

1. The combination of a liquid-containing vessel and a float of half the specific gravity of the liquid and of the shape obtained by halving a solid of revolution by a plane passing through its axis, said float being pivoted in the vessel and free to turn about the said axis.

2. The combination of a vessel containing ink or mucilage and a float of half the specific gravity of ink or of mucilage and of the shape of the solid generated by a half-revolution of a plane figure about an axis in its plane, the said float being pivoted in the vessel, so as to be free to turn about the said axis.

3. The combination, substantially as hereinbefore set forth, of a liquid-containing vessel, the dip-well communicating therewith, and the float pivoted in the liquid-containing vessel and adapted to force the liquid into the dip-well.

4. The combination, substantially as hereinbefore set forth, of a liquid-containing vessel, the dip-well communicating therewith, the float pivoted in the liquid-containing vessel, and the stops for limiting the movement of the pivoted float.

WILLIAM THOMAS SHAW.

Witnesses:
PERCY K. WOODWARD,
JNO. DEAN,
*Both of* 17 *Gracechurch Street, London, E.C.*